US008260669B1

(12) United States Patent
Folk et al.

(10) Patent No.: US 8,260,669 B1
(45) Date of Patent: Sep. 4, 2012

(54) SYSTEM AND METHOD OF TRANSFERRING TRANSACTION INFORMATION UPON OCCURRENCE OF A TRIGGERING EVENT

(75) Inventors: Amy Baker Folk, Charlotte, NC (US); Daniel Christopher Bohen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 98 days.

(21) Appl. No.: 12/398,356

(22) Filed: Mar. 5, 2009

Related U.S. Application Data

(60) Provisional application No. 61/121,335, filed on Dec. 10, 2008.

(51) Int. Cl.
*G06G 1/12* (2006.01)
*G06Q 20/00* (2006.01)

(52) U.S. Cl. .......................... 705/21; 235/379; 235/7 R

(58) Field of Classification Search ........................ None
See application file for complete search history.

(56) References Cited

U.S. PATENT DOCUMENTS

| | | | | |
|---|---|---|---|---|
| 7,219,083 | B2 | 5/2007 | Bellucci et al. | |
| 7,386,511 | B2 * | 6/2008 | Buchanan et al. | 705/45 |
| 2001/0020638 | A1 * | 9/2001 | Uematsu et al. | 235/379 |
| 2002/0152141 | A1 * | 10/2002 | Carter | 705/29 |
| 2005/0121513 | A1 | 6/2005 | Drummond et al. | |
| 2005/0187876 | A1 * | 8/2005 | Gessler | 705/42 |
| 2006/0065717 | A1 * | 3/2006 | Hurwitz et al. | 235/381 |
| 2009/0184034 | A1 * | 7/2009 | Doi et al. | 209/534 |

* cited by examiner

*Primary Examiner* — Luna Champagne
(74) *Attorney, Agent, or Firm* — Banner & Witcoff, Ltd; Michael A. Springs

(57) ABSTRACT

A method of transmitting and posting transaction information from a client to a financial institution is presented. In some arrangements, transaction information may be stored at a cash handling device or a bank application. Upon occurrence of a triggering event, the transaction information may be automatically transmitted for posting purposes from the client to the financial institution. In some arrangements, transactions may be bundled together and transmitted upon occurrence of the triggering event. In other arrangements, individual transactions may be transmitted upon occurrence of the triggering event.

21 Claims, 10 Drawing Sheets

SYSTEM AND METHOD OF TRANSFERRING TRANSACTION INFORMATION UPON OCCURRENCE OF A TRIGGERING EVENT

CROSS-REFERENCE TO RELATED APPLICATIONS

This application claims priority to U.S. Provisional Application No. 61/121,335, entitled "System and Method of Transferring Transaction Information Upon Occurrence of a Triggering Event," and filed Dec. 10, 2008, which is incorporated herein by reference in its entirety.

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow including cash recyclers which allow a retail establishment to maintain and re-use an amount of currency on-site. The cash recycler may further calculate and manage use of cash flows in real-time.

While cash recyclers allow a business to manage their cash flows in a more seamless manner, cash recyclers often are located in establishments having late night or around the clock operating hours. Accordingly, transactions conducted at a cash handling device located at a retail store or other location might not be posted to an account on the day the transaction occurred if the transaction occurred after the close of business at the financial institution associated with the cash recycler. As a result, reconciling accounts on the client side may be complicated and confusing. A method of controlling when transactions are transmitted to the financial institution would provide a more efficient, user-friendly system.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this disclosure relate to storing transaction information at a cash handling device and transmitting the information to a financial institution upon occurrence of a triggering event. For instance, reconcilement or other information may be stored at a cash handling device as they occur. Upon reaching a triggering event, such as the end of a shift, end of a business day, predetermined time of day, predetermined lapse of time, etc. the stored transaction information may be automatically transmitted to the financial institution.

In some arrangements, transaction information from multiple point of sale systems, such as transaction information from a plurality of cash drawers or tills, may be held at the cash handling device. Upon occurrence of the triggering event, the information may be bundled and transmitted to the financial institution as a single entry. Alternatively, information related to each till may be transmitted separately.

BRIEF DESCRIPTION OF THE DRAWINGS

The present disclosure is illustrated by way of example and not limited in the accompanying figures in which like reference numerals indicate similar elements.

The reader is advised that the attached drawings are not necessarily drawn to scale.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
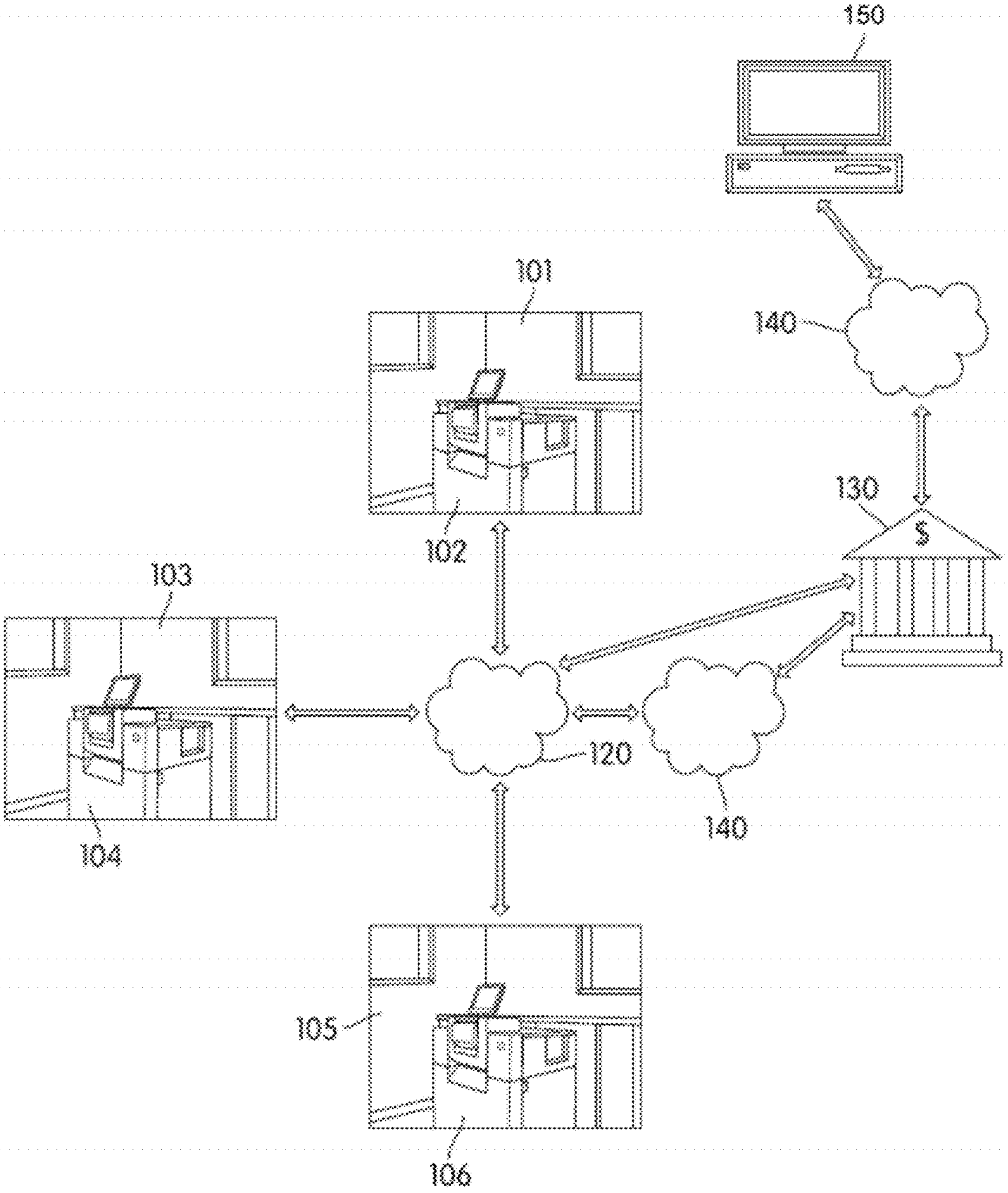
FIG. 1 illustrates an example of a suitable operating environment in which various aspects of the disclosure may be used.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Figure 2:
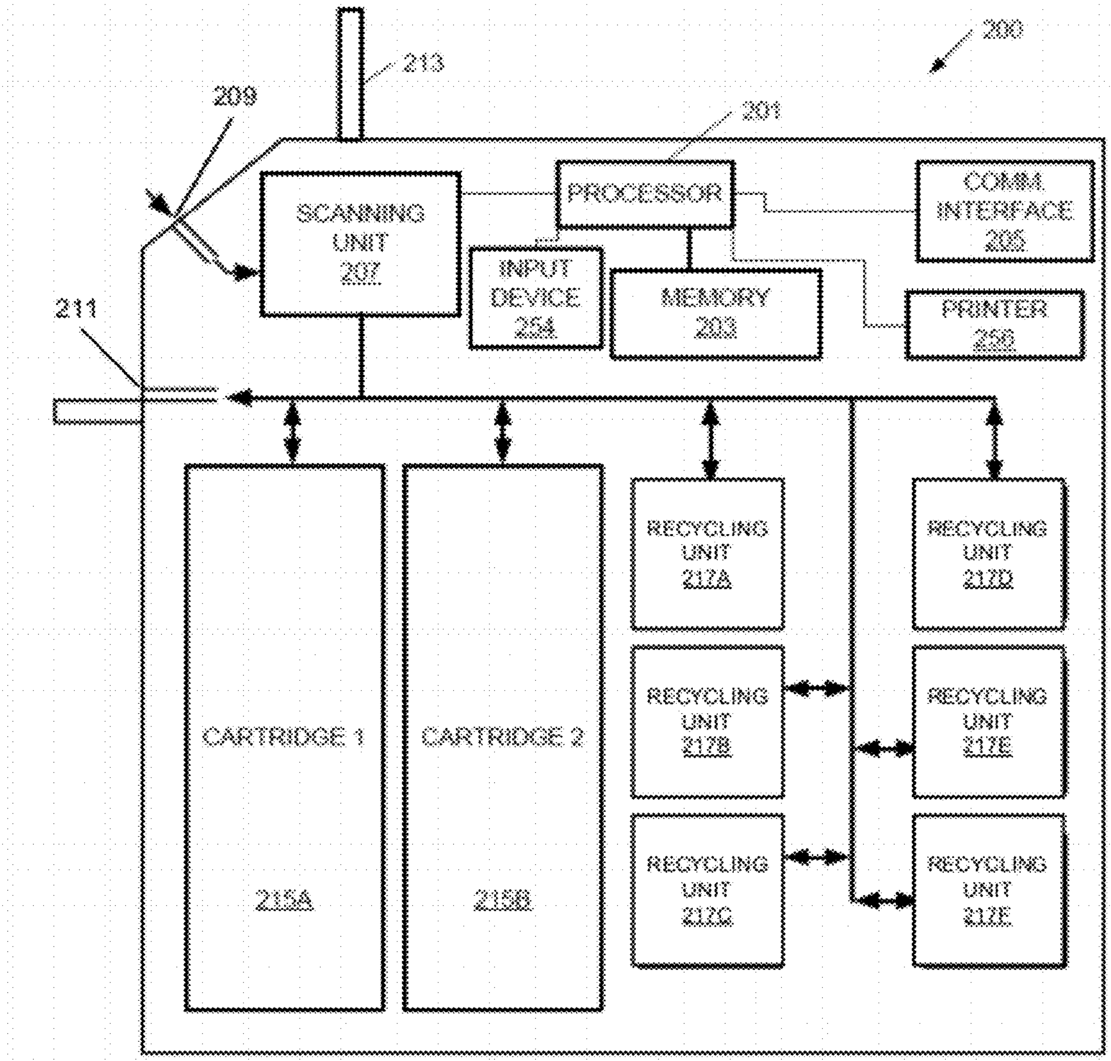
FIG. 2 illustrates a simplified diagram of a currency recycler in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and recycling units, such as stackers and/or rolled storage modules (RSMs) 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, recycling units 217 and cartridges 215 are configured to store currency. Currency may be inserted through input slot 209 and withdrawn through withdrawal slot 211. Recycling units 217 may be used to store and organize currency based on denomination. For example, all $5 bills may be stored in recycling unit 2 (i.e., recycling unit 217B) while all $20 bills may be stored in recycling unit 3 (i.e., recycling unit 217C). Cartridges 215A and 215B, on the other hand, may be used to store overflow currency and/or currency for transport. Thus, if recycling units 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and recycling units 217 may further be removable for easier access or transport.

Scanning unit 207 may be configured to scan each bill or currency that is inserted into recycler 200. Scanning unit 207 may be configured to detect defects, invalid reproductions, denomination, type of currency (e.g., which country the currency originates from) and the like. Scanning unit 207 may further be configured to refuse money (either through input slot 209 or withdrawal slot 211) if it cannot be properly recognized or if the currency is deemed to be an invalid reproduction. Scanning unit 207 may send such data to processor 201 which may, in turn, save the data in memory 203.

Further, recycler 200 may include one or more mechanical or electromechanical systems (not shown) for automatically transferring currency between recycling units 217, cartridges 215, input slot 209 and withdrawal slot 211 in recycler 200. For example, currency may automatically be withdrawn from recycling units 217 and directed into cartridge 215A for storage using a series of motorized rollers. In another example, currency stored in cartridge 215A may be withdrawn and organized and stored into recycling units 217 according to denomination. Using such systems to facilitate the automated movement of currency between storage components and other portions of recycler 200 may provide efficiency and security by alleviating some of the need to manually handle currency stored within recycler 200.

Figure 3:
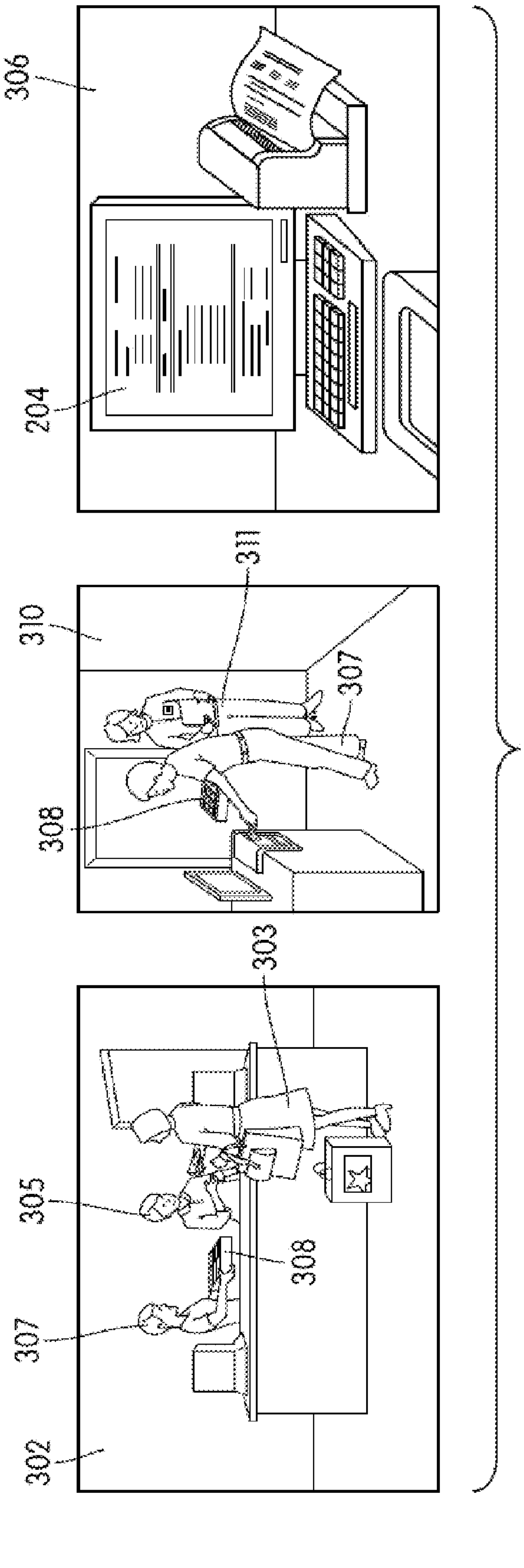
FIG. 3 illustrates various features of a currency recycler that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
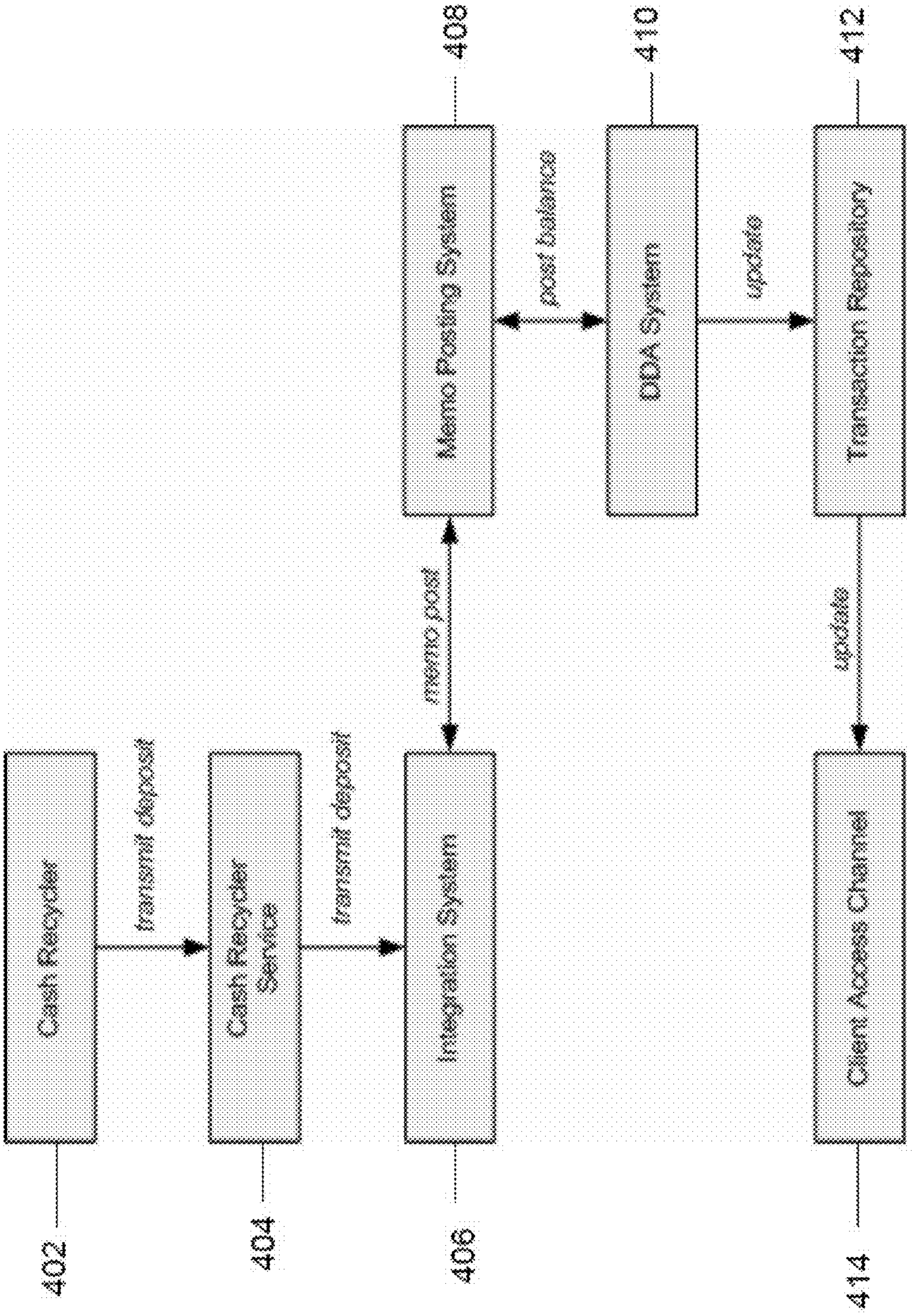
FIG. 4 illustrates additional features of a currency recycler used in various aspects of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

In some arrangements, cash recyclers may be used to distribute currency to one or more cash drawers or tills, such as a till for a cash register or other point of sale system. The system and method described herein permits a user to preconfigure the amount of currency to be distributed to each till. Further, the preconfigured amount of currency may include the number of bills of each denomination to distribute to each till. In some arrangements, the amount of preconfigured currency is identical for each till to ensure that each point of sale system has the same amount of currency in the till. This aids in balancing funds at the end of a shift, end of a day, etc. In addition, the cash recycler described herein may include one or more slots into which a till may be inserted. Upon insertion of a till, the cash recycler may automatically distribute the preconfigured amount of currency to each till.

Figure 5:
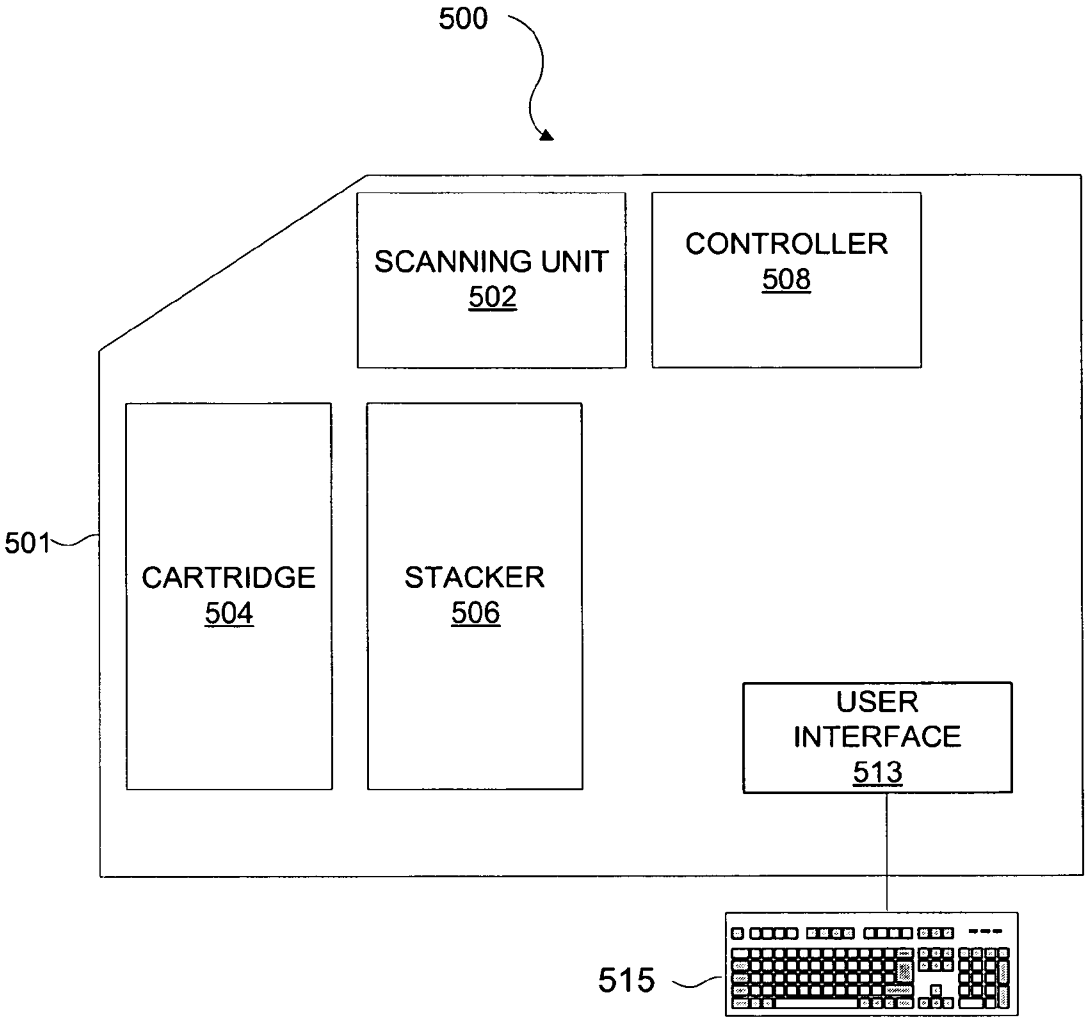
FIG. 5 is a schematic diagram of a currency recycler including various components used in accordance with one or more aspects of the invention.

FIG. 5 illustrates an example cash recycler 500. The cash recycler 500 or other currency handling device described above may include various components. For instance, the cash recycler 500 may include some or all aspects of the cash recycler 200, as shown in FIG. 2. The cash recycler 500 of FIG. 5 includes a controller 508 configured to process transactions including transmitting data to a financial institution for recognition at the financial institution, control mechanical systems of the cash recycler 500, control access to one or more portions of recycler 500, reconcile logical and physical counts of funds and the like. The controller 508 may be an external component or may be integrated into the cash recycler 500. The controller 508 generally includes a processor and memory such as RAM and ROM (not shown). In addition, the controller 508 may include or have access to storage and include user interface 513. The user interface 513 may include a display as well as various input devices such as a keyboard 515, mouse, etc. In some arrangements, the display may be a touch-sensitive display thereby allowing user input to be received through the display. Additionally or alternatively, the user interface 513 may be configured to receive voice commands. The controller 508 may further be configured to control various peripheral devices, such as a printer, external storage device, speakers and the like using one or more adapters and interfaces (not shown).

The controller 508 is further configured to execute software for providing functionality to the cash recycler 500. For instance, the controller 508 may execute commands as directed by the software instructions to control transactions made using the currency recycler 500, communicate with the financial institution or other entity, provide outputs via the user interface 513 or a peripheral device, such as a printer, and also to physically move the currency within the cash recycler 500.

In one example, a user may deposit $1000 into the cash recycler 500. The user provides input through the user interface 513 regarding the deposit. This user input may include selection from a display, voice commands, and the like. The money is then deposited into the cash recycler 500. In one arrangement, the controller 508, in response to various instructions provided by software, may control the mechanical systems of the cash recycler 500, as well as the electronic (e.g., a communications interface) systems of the cash recycler 500. For instance, the controller 508 may operate the mechanical system that controls the flow of currency into the machine during a deposit. In another arrangement, the controller 508 may house the software configured to send and receive transaction data between recycler 500 and a remote device through a communication interface. In addition, the controller 508 controls the scanning device 502 to scan each bill inserted into the cash recycler 500 to confirm authenticity and to verify the condition of the bill. If a bill is deemed to be an invalid reproduction, it may be removed from circulation and stored in a separate region of the cash recycler 500. In particular, the controller 508 may engage various mechanical systems such as automated rollers to store the bill in the separate region. If the bill is deemed too worn to be returned to circulation, the mechanical systems operated by the controller 508 may remove the bill and place it in a separate region for storage. If the bill is deemed suitable to return to circulation it may remain or be placed with the bills in the recycler 500 that are eligible for recirculation from recycler 500. Further, controller 508 may reconcile a deposit amount specified by a depositing user and a physical count of the currency actually deposited to insure accuracy and integrity. In addition, the controller 508 may store data related to the amount of currency inserted into the cash recycler 500, as well as the amount of currency removed from circulation for various reasons. In still other examples, the controller 508 may aid in transmitting the cash transaction information to the financial institution. Additionally or alternatively, the controller 508 may forward a communication, such as an email, to an email box reporting the cash transaction. In still other arrangements, the controller 508 may forward a report of the cash transaction to a peripheral device, such as a printer, to print the report as a record of the cash transaction.

Additionally or alternatively, access to the various functions of the cash recycler 500 may be password protected or may require other authorization, such as use of a radio-frequency identification (RFID) badge and authentication before a user may perform or adjust those functions. In one arrangement, biometric data, such as fingerprint, iris scan, and the like, may be used to authenticate a user of the cash recycler 500 to permit adjustment to various settings. In addition, access to the internal portion of the cash recycler 500 may be restricted to only authorized users. The cash recycler 500 may include one or more locks to prevent unauthorized access to the internal portion of the cash recycler 500. Integrating the controller 508 within the cash recycler 500 provides such additional security to prevent unauthorized access to the computer systems and internal portion of the cash recycler 500 and reduces the ability of would-be intruders to hack into the controller 508 and bypass such security measures.

Cash handling devices may transfer transaction information from the cash handling device to the financial institution in multiple ways. For instance, transactions occurring at the cash handling device may be immediately or nearly immediately recognized at the financial institution. In some arrangements, a client may desire to forego or postpone the rapid recognition of funds in order to simplify the transactions (i.e, have fewer transactions to transmit, etc). For instance, a client may wish to store multiple transactions as a bundle and have the bundle be transmitted and rapidly recognized (i.e., post to a client's DDA account immediately or substantially immediately) upon occurrence of a predetermined triggering event. In some arrangements, the holding or batching of these transactions, and subsequent rapid recognition of the batch may be accomplished by the software resident on the hardware (i.e., cash handling device) or by a financial institution application. For instance, if the software performs the holding or batching then transmission lines between the cash handling device and financial institution would not need to remain connected for as great a period of time as with other arrangements. In addition, the financial institution would receive consolidated information that may reduce processing time for the client.

On the other hand, if the financial institution handles the holding or batching then the financial institution is immediately or almost immediately transmitting transaction information as it occurs and it can be posted upon occurrence of a triggering event. This arrangement may minimize the opportunity for transactions to be lost should transmissions be interrupted.

In addition, a client may wish to have some or all transactions occurring in a business day, as defined by the retail store, post on a single day (i.e., a single bank business day), rather than multiple bank business days or calendar days as may happen with rapid recognition. For instance, as transactions are rapidly recognized, transactions occurring within the business day of the financial institution will post on that business day. However, transactions occurring after the close of the financial institution may not be posted until the following business day. This can result in confusion for the retail store that may conduct a considerable amount of business after the close of the financial institution and may have transactions occurring in a single calendar day posting on more than one day.

Accordingly, a client may choose to aggregate or bundle transaction information and transmit the information to the financial institution upon occurrence of a triggering event. For instance, a client may desire to have all transaction information transmitted to the financial institution automatically upon the close of a shift, register, day, etc. or at a predetermined time, after a lapse of a predetermined amount of time, etc. This arrangement permits the client to customize the posting and recognition of transactions in order to simplify record keeping and provide information according to a time period used or desired by the client.

Figure 6:
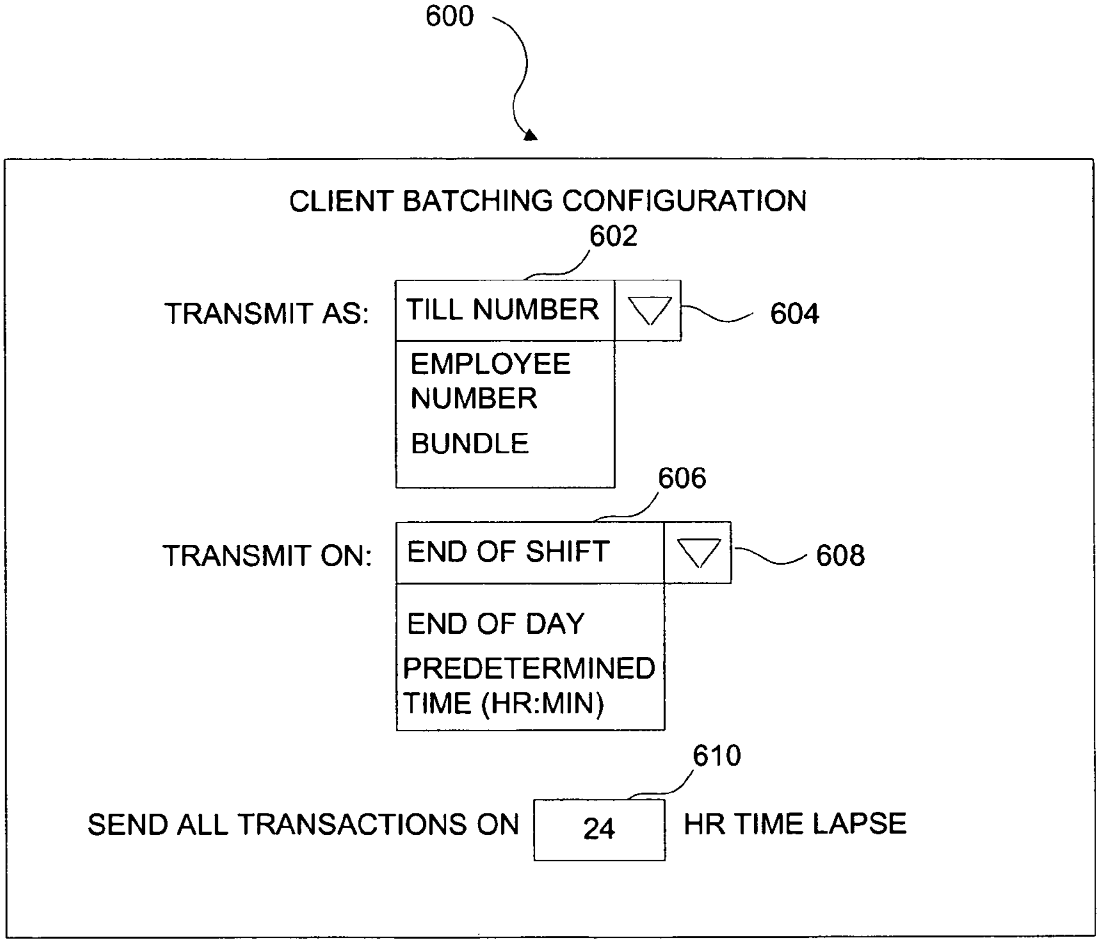
FIG. 6 illustrates one example user interface for configuring the client information transmission method and system described herein.

FIG. 6 illustrates one example user interface 600 in which a client may customize the transfer of transaction information to the financial institution. In field 602, a client may specify how the financial information will be transmitted. For instance, a retail store having several cash drawers or tills at various point of sale systems may reconcile each individual till. That reconciliation information may be transmitted individually as that particular till (i.e., having a till number or other unique identifier). Additionally or alternatively, the information may be sent from the client to the financial institution based on the employee using that particular device or cash drawer, i.e., information associated with an employee, employee number or other employee identifier would be transferred. In some arrangements, the transaction information from the devices or point of sale systems may be bundled together and transferred to the financial institution in one transmission. This arrangement is described in further detail below.

Selection of the type of transmission may be performed using various methods including selection of the desired option from a drop-down menu, as shown in FIG. 6 by selecting the arrow 604, by selection of a radio button associated with the desired option, clicking or double-clicking within the field and typing in the entry, etc.

A client may further customize transmissions to the financial institution by indicating a triggering event that will initiate transmission of the transaction information from the client to the financial institution. For instance, the client may select end of shift in field 606 from the drop-down menu 608 to indicate that, upon receiving an indication that a shift has ended (i.e., time of day, time elapsed from previous indication, etc.) the transactions will be automatically transmitted from the cash handling device to the financial institution. For example, if a client has selected to bundle transactions, all transaction information, such as net deposit information or point of sale system sales, for one or more cash drawers or tills used during a shift will be automatically transferred to the financial institution upon the occurrence of the triggering event (i.e., end of shift in this example).

Additionally or alternatively, other triggering events may be used to initiate the automatic transmission of information from the client to the financial institution, such as end of day, a number of transactions conducted, an amount of funds received or transacted, a predetermined time, etc.

In field 610 a client may also establish a predetermined time lapse after which all transaction information not sent to the financial institution will be transferred. For instance, field 610 indicates that all transaction information will be transferred upon a lapse of 24 hours. This will ensure that all transaction information is being transferred to the financial institution. In some arrangements, the financial institution may require all information to be sent within a certain time lapse or may grab the transaction information after a certain period of time has elapsed.

This customization of transferring information from the client to the financial institution permits the client to better customize posting, data, etc. for their particular business. That is, posting of client transactions on various bank business days can be confusing and may complicate the clients record keeping processes. Customization of the transfer of information may permit a client to hold and/or aggregate transaction information to better control when the information will post. For instance, a client may hold all transactions in a business day and transfer to the financial institution on the next business day to ensure that all transactions will post in a single calendar day.

Figure 7:
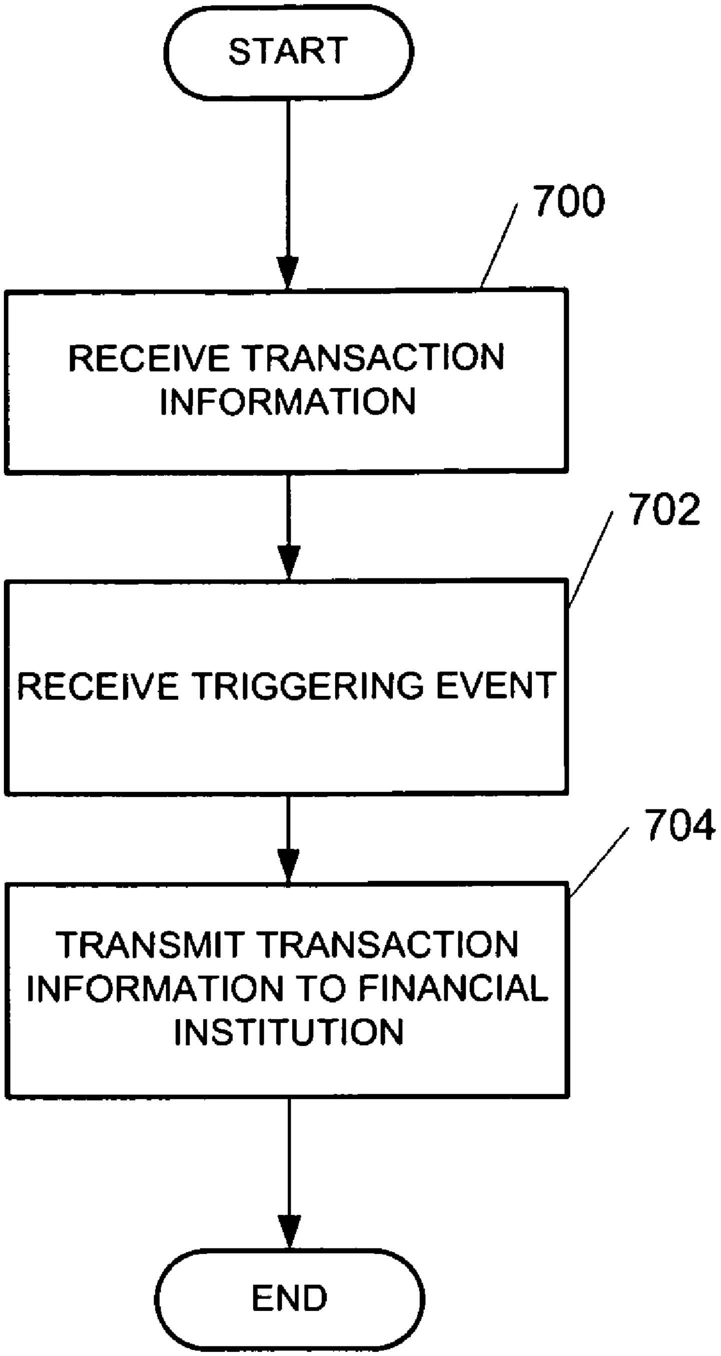
FIG. 7 illustrates an example method of transmitting financial information from the client to the financial institution according to aspects described herein.

FIG. 7 illustrates one example method of event driven posting, such as described above. In step 700, transaction information may be received, for instance, at a cash handling device such as a cash recycler. The transaction information may include net deposit information from one or more cash drawers associated with point of sale systems, etc. A client may configure the cash handling device to hold the transaction information until the occurrence of a triggering event. In step 702, a triggering event may occur and may be detected. For instance, the cash handling device receives notification or recognizes that a shift has ended, a day has ended, etc. The triggering event may be specified by the client as described above. In step 704, the occurrence of the triggering event will automatically initiate a transfer of information from the cash handling device to the financial institution. The information transferred may be predetermined by the client and may include net deposit information as described above, or other transaction information.

Figure 8:
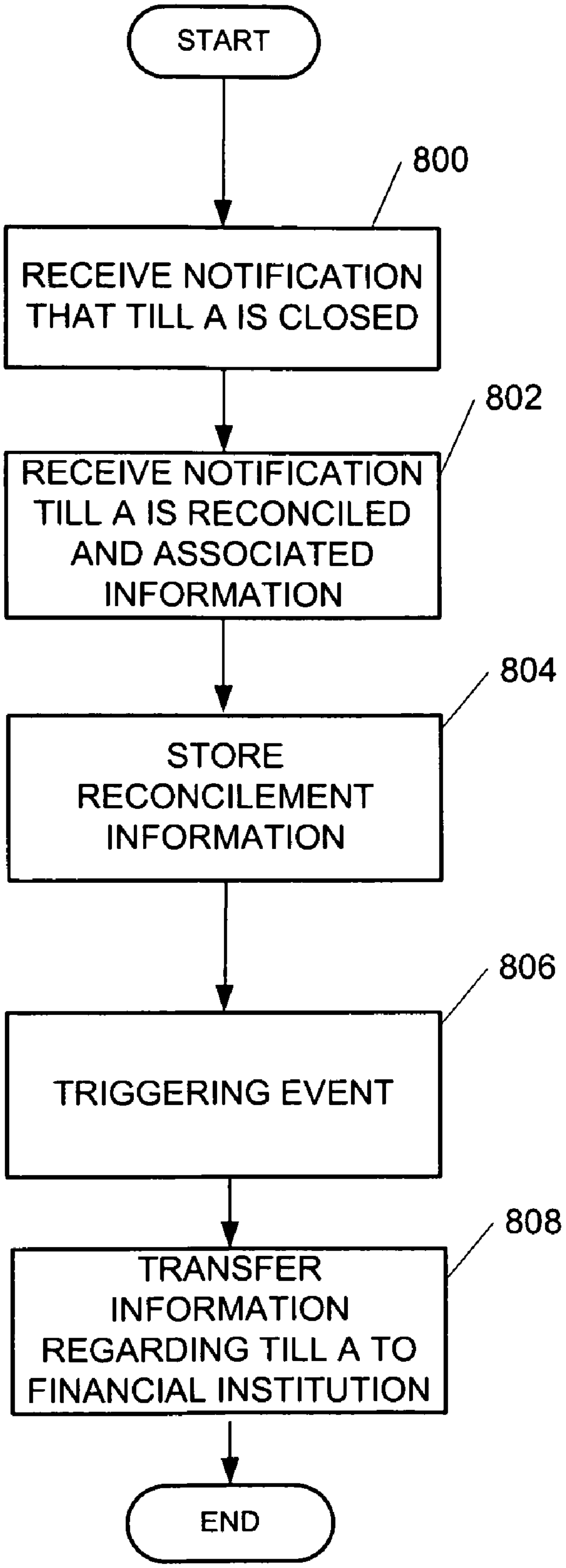
FIG. 8 illustrates another example method of transmitting financial information from the client to the financial institution according to aspects described herein.

FIG. 8 illustrates another example method of event driven posting as described herein. In step 800, one till, such as till A may be closed and a notification of the till being closed may be received, for instance, at a cash handling device, such as a cash recycler. In step 802, the till may be reconciled and the reconciliation information may be received at the cash handling device. In some arrangements, the reconciliation may be completed at the cash handling device and/or at another location. Additional counting and/or sorting devices may be used in the reconciliation of the till. The reconcilement information will then be held at the cash handling device until the occurrence of a triggering event, as shown in step 804.

In step 806 a triggering event may occur. As discussed above, the triggering event may be the end of a shift, day, predetermined time, etc. The cash handling device may recognize or receive notification of the triggering event. In step 808, the occurrence of the triggering event will automatically initiate the transfer of reconcilement information associated with till A to the financial institution.

Figure 9:
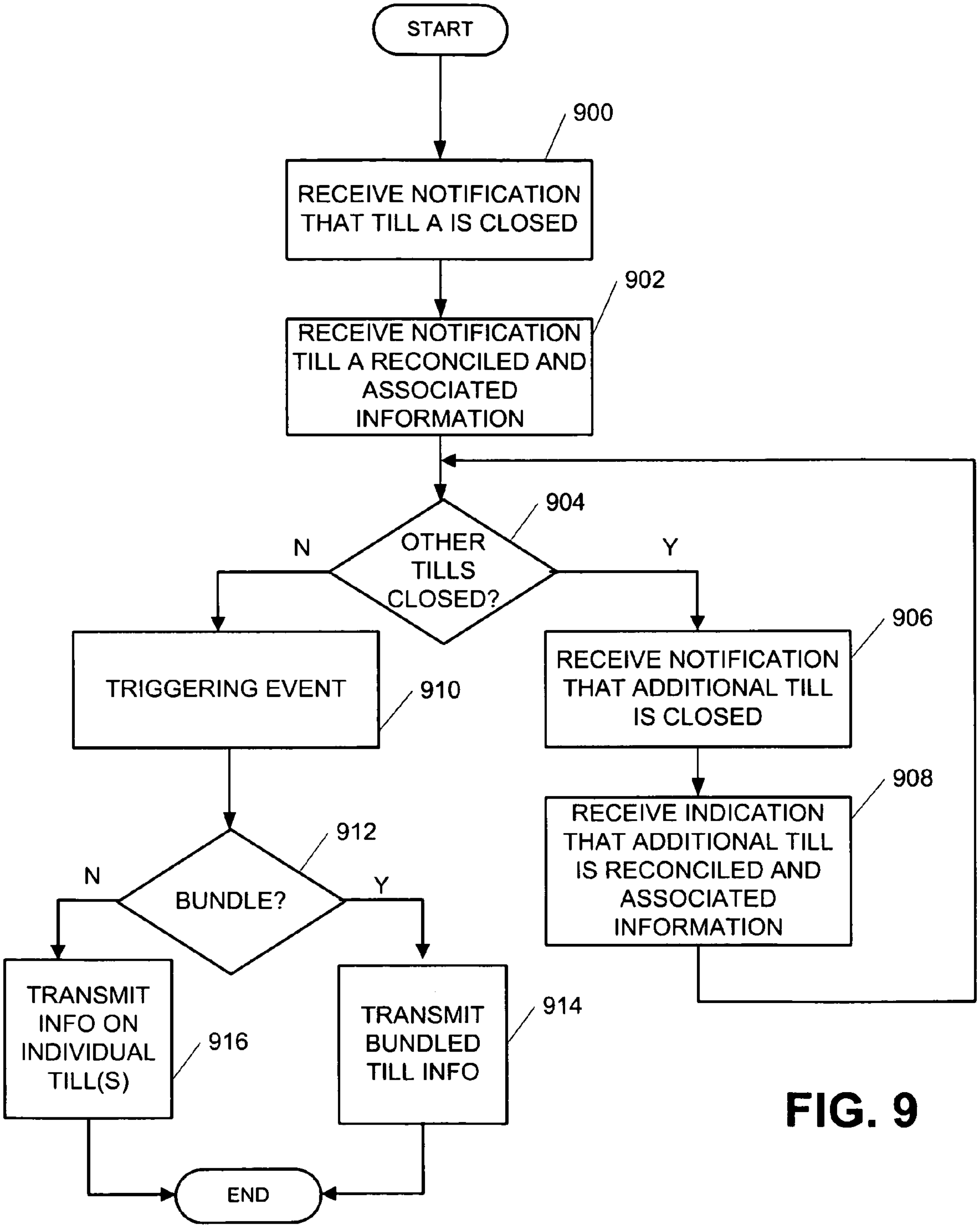
FIG. 9 illustrates yet another example method of transmitting financial information from the client to the financial institution according to aspects described herein.

FIG. 9 illustrates yet another example method of event driven posting according to aspects described herein. In step 900, a notification is received that a till, such as till A, is closed. The notification or indication may be received at a cash handling device, such as a cash recycler. In step 902, till A is reconciled and the reconcilement information is received at the cash handling device. In some arrangements, reconciliation may occur at the cash handling device. In step 904, a determination is made as to whether there are additional tills that are closed. If an additional till is closed, as indicated in step 906, the till will be reconciled and the reconciliation information transmitted to the cash handling device in step 908. If additional tills are closed, the process will repeat. The reconcilement data may be held at the cash handling device until the occurrence of a triggering event.

Once all closed tills have been recognized, a triggering event may occur in step 910. The triggering event may be recognized at the cash handling device and/or a notification of the triggering event may be received at the cash handling device. The triggering event will automatically initiate transfer of transaction information from the client to the financial institution and, in step 912 a determination is made as to whether the information should be bundled and transmitted to the financial institution or transmitted as separate transaction information for each till. In step 914, the till transaction information is bundled and transmitted to the financial institution as a single entry. Alternatively, in step 916, the information regarding the individual tills will be transmitted to the financial institution individually as a plurality of entries. In some instances, there may be one transaction for each till. In other arrangements, multiple tills may be combined and associated with the employee who used those tills and that information will be sent as a single entry, etc.

Figure 10:
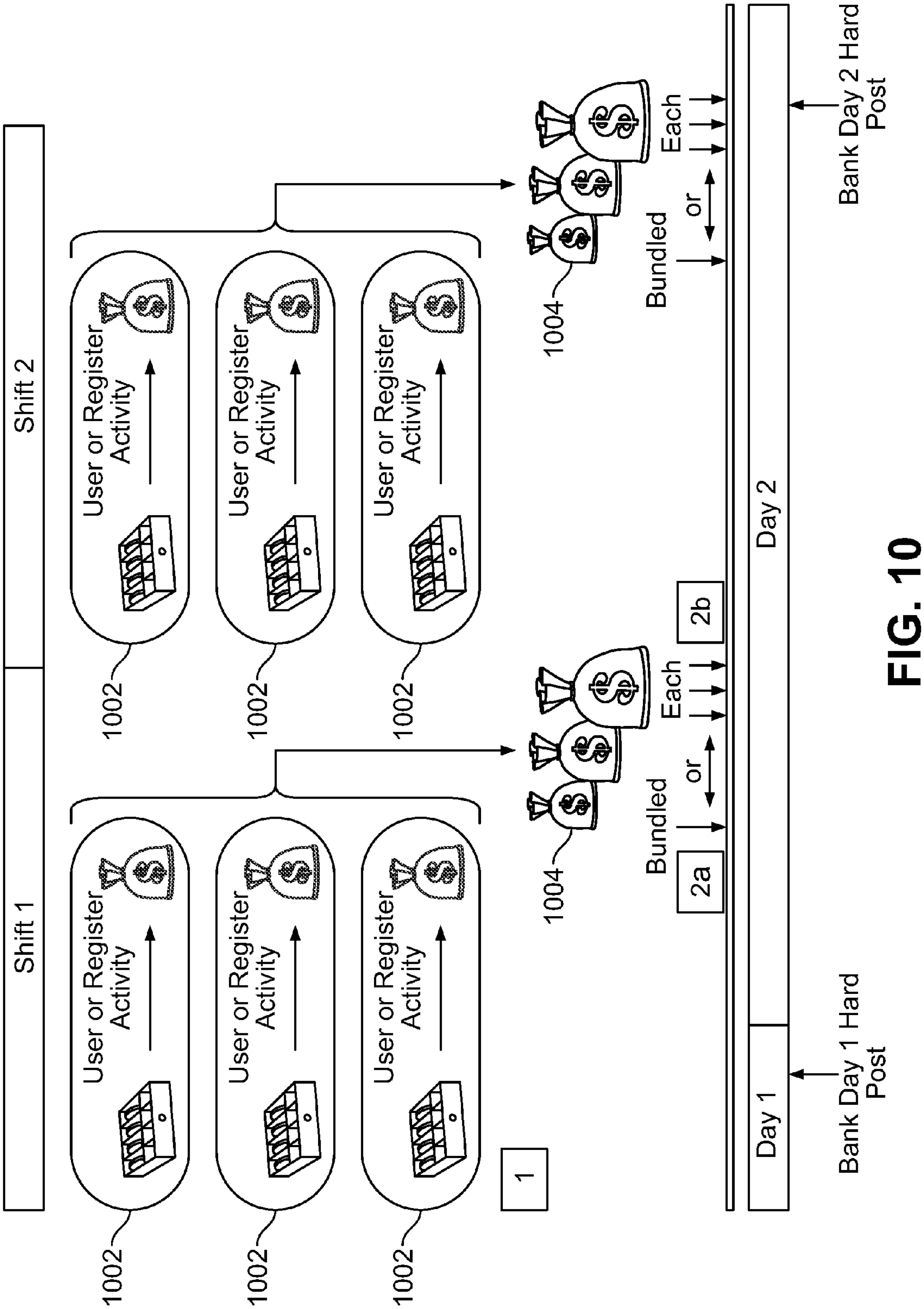
FIG. 10 depicts one arrangement according to aspects described herein.

FIG. 10 illustrates one arrangement according to aspects of the method of FIG. 9. As shown in FIG. 10, shift 1 may include a plurality of cash drawers or tills 1002. At the end of the shift, the tills 1002 are closed and reconciled. This reconciliation information is then transferred to the financial institution. As shown, the information may be transmitted bundled or individually. The same process may be performed at the close of shift 2. Although shift 1 spans the business days 1 and 2 of the financial institution, transmitting the transaction information at the close of shift 1 and shift 2 permits the transactions to post in the same business day, which, in this example, is business day 2 of the financial institution. This will increase efficiency associated with the transaction, transfer of information, etc.

In some arrangements, the bundled transactions may be associated with a specific business day. For instance, if a client stores transaction information for, for example, Saturday, Sunday and Monday, the transactions associated with each calendar day, business day, etc. may be bundled together and, upon occurrence of a triggering event, three bundles (i.e., one for each day) will be automatically transmitted to the financial institution.

In still other arrangements, transactions may be assigned to a business day according to a client's predetermined definition of a business day. For instance, a client may have a business day that runs from 4:00 a.m. on calendar day 1 to 4:00 a.m. on calendar day 2. In this example, all transactions information from transactions occurring within the business day that spans calendar day 1 and calendar day 2 may be bundled together and transmitted to the financial institution for posting. This may permit a client to align transaction information (such as sales information from various point of sale systems) with the client business day, even if the client business day does not align with a calendar day or with the business day of the financial institution.

The arrangements described above may provide greater flexibility for clients to control or determine when transactions are transferred to a financial institution, when they will post, how they will be organized upon transfer, etc. In addition, bundling of transaction information into a single transmission may simplify reconciliation at the financial institution because fewer transactions will have to be processed. Further still, bundling transactions and holding them for transmission in one entry may open up connectivity of the cash handling device. For instance, the connection between the cash handling device and the financial institution need only be maintained when transaction information is being transferred, rather than maintaining a constant connection. This may be an optional or additional feature for clients who wish to limit connectivity.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

What is claimed is:

1. A method of forwarding transaction information to a financial institution, comprising:

receiving, by a first cash handling device, transaction information of a transaction occurring at a second cash handling device, wherein the first cash handling device and the second cash handling device are configured to receive cash;

storing the received transaction information of the transaction occurring at the second cash handling device by the first cash handling device;

receiving, by the first cash handling device, identification of a triggering event configured to prompt transmission of the transaction information from the first cash handling device to the financial institution;

receiving, by the first cash handling device, an indication that the identified triggering event has occurred; and responsive to receiving the indication that the triggering event has occurred, automatically transmitting the transaction information from the first cash handling device to the financial institution.

2. The method of claim 1, wherein the first cash handling device is a cash recycler.

3. The method of claim 1, wherein the second cash handling device is a point of sale system.

4. The method of claim 3, wherein the transaction information includes a net deposit from the point of sale system.

5. The method of claim 3, further including receiving information from a plurality of point of sale systems.

6. The method of claim 3, wherein the triggering event is an indication that a till of a point of sale system is closed and reconciled.

7. The method of claim 1, wherein the triggering event is a predetermined time within a shift.

8. The method of claim 1, wherein the triggering event is a predetermined time of day.

9. The method of claim 1, wherein the triggering event includes a lapse of a predetermined amount of time.

10. A method of forwarding transaction information to a financial institution, comprising:

receiving, by a cash handling device, an indication that a till is closed;

receiving, by the cash handling device, reconcilement information related to the closed till;

storing the reconcilement information by the cash handling device;

receiving, by the cash handling device, identification of a triggering event configured to prompt transmission of the reconcilement information from the cash handling device to the financial institution;

receiving, by the cash handling device, an indication that the identified triggering event has occurred; and upon receiving the indication that the triggering event has occurred, automatically transmitting the reconcilement information from the cash handling device to the financial institution, wherein the identified triggering event is a predetermined lapse of time.

11. The method of claim 10, wherein the reconcilement information includes a net deposit.

12. A method of forwarding transaction information to a financial institution, comprising:

receiving, by a cash handling device, an indication that a first till is closed;

receiving, by the cash handling device, reconcilement information related to the first closed till;

storing, by the cash handling device, the reconcilement information of the first closed till;

determining, by the cash handling device, if additional tills are closed;

upon determining that additional tills are closed, receiving, by the cash handling device, reconcilement information related to a second closed till;

storing, by the cash handling device, the reconcilement information of the second closed till;

receiving, by the cash handling device, identification of a triggering event configured to prompt transmission of the reconcilement information of the first and second closed tills from the cash handling device to the financial institution;

receiving, by the cash handling device, an indication that the identified triggering event has occurred; and automatically transmitting the reconcilement information of the first and second closed tills from the cash handling device to the financial institution, wherein the identified triggering event is a predetermined lapse of time.

13. The method of claim 12, wherein the reconcilement information of the first closed till includes a net deposit from the first closed till associated with a point of sale system.

14. The method of claim 12, wherein the reconcilement information of the second closed till includes a net deposit from the second closed till associated with the point of sale system.

15. The method of claim 12, wherein the step of transmitting the reconcilement information of the first and second closed tills includes bundling the reconcilement information of the first closed till and the second closed till prior to transmitting the information to the financial institution.

16. The method of claim 12, wherein the step of transmitting the reconcilement information of the first and second closed tills includes transmitting the reconcilement information of the first closed till separately from the reconcilement information of the second closed till.

17. The method of claim 12, wherein the cash handling device is a cash recycler.

18. The method of claim 12, further including, prior to the step of receiving an indication that a triggering event has occurred, determining that no additional tills are closed.

19. The method of claim 12, wherein the step of transmitting the reconcilement information of the first and second closed tills to the financial institution is performed automatically.

20. One or more non-transitory computer-readable media storing computer executable instructions that, when executed, cause an apparatus to perform a method, comprising:

receiving, by a cash handling device, an indication that a till is closed;

receiving, by the cash handling device, reconcilement information related to the closed till;

storing the reconcilement information by the cash handling device;

receiving, by the cash handling device, identification of a triggering event configured to prompt transmission of the reconcilement information from the cash handling device to the financial institution;

receiving, by the cash handling device, an indication that the identified triggering event has occurred; and upon receiving the indication that the triggering event has occurred, automatically transmitting the reconcilement information from the cash handling device to the financial institution, wherein the identified triggering event is a predetermined lapse of time.

21. The one or more computer-readable media of claim 20, wherein the reconcilement information includes a net deposit.

* * * * *